(12) United States Patent
Romano

(10) Patent No.: US 7,616,023 B2
(45) Date of Patent: Nov. 10, 2009

(54) METHOD OF DETECTING A MALFUNCTION OF AN ENCODER FOR A VEHICLE DRIVE SYSTEM

(75) Inventor: Paschal J. Romano, Fenton, MI (US)

(73) Assignee: Delphi Technologies, Inc., Troy, MI (US)

( * ) Notice: Subject to any disclaimer, the term of this patent is extended or adjusted under 35 U.S.C. 154(b) by 202 days.

(21) Appl. No.: 11/821,238

(22) Filed: Jun. 22, 2007

(65) Prior Publication Data

US 2008/0315909 A1    Dec. 25, 2008

(51) Int. Cl.
*G01R 31/34* (2006.01)
(52) U.S. Cl. ...................................... 324/772
(58) Field of Classification Search .............. None
See application file for complete search history.

(56) References Cited

U.S. PATENT DOCUMENTS

| | | | |
|---|---|---|---|
| 3,794,899 A * | 2/1974 | Breslow ..................... | 318/602 |
| 4,580,084 A * | 4/1986 | Takahashi et al. ........... | 388/844 |
| 4,744,041 A * | 5/1988 | Strunk et al. ................ | 324/177 |
| 4,800,324 A * | 1/1989 | Kuttner ..................... | 318/293 |
| 5,666,066 A | 9/1997 | Jo | |
| 5,723,858 A | 3/1998 | Sugden | |
| 5,811,946 A | 9/1998 | Mullin et al. | |
| 6,064,165 A | 5/2000 | Boisvert et al. | |
| 6,263,995 B1 | 7/2001 | Watson et al. | |
| 6,333,614 B1 * | 12/2001 | Kerner ..................... | 318/602 |
| 6,791,218 B1 | 9/2004 | Dragoi et al. | |
| 6,986,688 B1 * | 1/2006 | Jansen ....................... | 440/1 |
| 7,205,737 B1 | 4/2007 | Bilodeau | |
| 7,265,511 B2 * | 9/2007 | Ide ........................... | 318/609 |
| 2004/0195989 A1 * | 10/2004 | Harriman et al. ............ | 318/599 |
| 2007/0075657 A1 * | 4/2007 | Moller et al. ................ | 318/77 |
| 2008/0116898 A1 * | 5/2008 | Washington ................ | 324/521 |
| 2008/0298784 A1 * | 12/2008 | Kastner ..................... | 324/177 |

* cited by examiner

*Primary Examiner*—Jermele M Hollington
(74) *Attorney, Agent, or Firm*—Thomas N. Twomey

(57) ABSTRACT

A method of detecting a malfunction of an encoder used in a vehicle drive system includes determining an error of a motor speed based on an estimated motor speed, wherein the estimated motor speed is a function of measured current over a predetermined interval of time. The method further includes determining a maximum allowable error of the motor speed at the measured current. Yet further, the method includes comparing the error of the motor speed with the maximum allowable error of the motor speed, thereby detecting the malfunction of the encoder.

18 Claims, 1 Drawing Sheet

METHOD OF DETECTING A MALFUNCTION OF AN ENCODER FOR A VEHICLE DRIVE SYSTEM

BACKGROUND

The present disclosure relates generally to vehicle drive systems including an encoder and to methods for detecting a malfunction of the encoder.

Encoders are often used in vehicle drive systems for motorized vehicles such as, for example, automobiles, motorcycles, tractors, motorized wheelchairs, and/or the like. The encoder may be used in combination with a DC electric motor to provide information or output on the rotation of the motor at a particular instant of time. This rotational information may then be used to calculate, for example, the operating speed of the motor.

During substantially normal operating conditions (i.e., when the motor is rotating), a malfunction of an encoder may, in some instances, be readily detected. For example, for encoders with quadrature, loss of a single output channel while the motor is still rotating may still enable an operator to detect failure of the encoder by noting output pulses from another working channel. Loss of both channels of an encoder with quadrature while the motor is still rotating still enables an operator to detect a malfunction of the encoder. This is accomplished by noting that the rate of change in the calculated speed of the motor is substantially greater than a deceleration rate (i.e., the most aggressive operating deceleration) of the motor during the normal operating condition.

If the motor speed is controlled by a feedback speed control system, detection of a malfunctioning encoder is relatively important to minimize or prevent undesired drive wheel motion. Conversely, it is also relatively important to not incorrectly identify an encoder malfunction during a stalled motor condition.

SUMMARY

A method of detecting a malfunction of an encoder used in a vehicle drive system includes determining an error of a motor speed based on an estimated motor speed, wherein the estimated motor speed is a function of a measured current over a predetermined interval of time, and determining a maximum allowable error of the motor speed at the measured current. The method further includes comparing the error of the motor speed with the maximum allowable error, thereby detecting the malfunction of the encoder.

The vehicle drive system includes a rotatable armature and an encoder operatively connected to the armature, where the encoder provides an output substantially synchronized with rotation of the armature. The vehicle drive system further includes a control unit operatively connected to the motor and configured to selectively permit a current to flow to the motor, wherein the control unit is configured to calculate an error of a motor speed based on an estimated motor speed, wherein the estimated motor speed is a function of a measurement of current over a predetermined interval of time. The control unit is further configured to calculate a maximum allowable error of the motor speed at the measured current, and to compare the error of the motor speed with the maximum allowable error at the measured current. Based on the comparison, if the error of the motor speed is substantially greater than the maximum allowable error of the motor speed at the measured current over the predetermined interval of time, then the encoder is considered to be malfunctioning.

BRIEF DESCRIPTION OF THE DRAWINGS

Features and advantages of embodiments of the present disclosure will become apparent by reference to the following detailed description and drawings, in which like reference numerals correspond to similar, though not necessarily identical components. Reference numerals having a previously described function may not necessarily be described in connection with other drawings in which they appear.

DETAILED DESCRIPTION

Embodiment(s) of the method of detecting a malfunction of an encoder for a vehicle drive system as disclosed herein advantageously determines if the encoder has malfunctioned in the vehicle drive system. The present inventor has recognized that a difficulty with detecting encoder malfunction is that the output of a malfunctioning encoder can mimic a valid state—zero or near zero motor speed. Thus, it may be difficult for an operator to detect a malfunction of the encoder, particularly when the motor is accelerating from zero speed to a higher speed.

The present method is accomplished by comparing a calculated error of the motor speed based on a measurement of current over a predetermined interval of time with a maximum allowable error of the motor speed at the measured current. Based on the comparison, if the error of the motor speed exceeds the maximum allowable error, the encoder is considered to be malfunctioning. The method may also advantageously be implemented into a vehicle drive system including a single encoder for each motor used in the system, while a control unit in the vehicle drive system substantially accurately detects a malfunction of the encoder(s).

Figure 1:
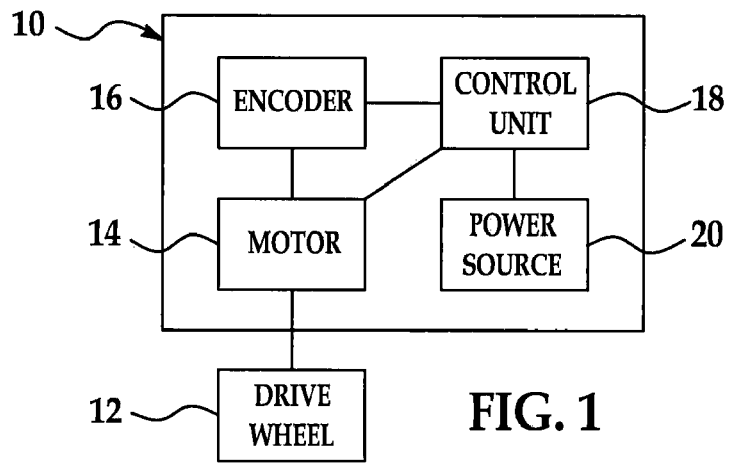
FIG. 1 is a schematic depiction of an embodiment of a vehicle drive system including an encoder.

A vehicle drive system employing the method of detecting a malfunction of an encoder is schematically depicted in FIG. 1. The vehicle drive system 10 communicates with a drive wheel 12 of a motorized vehicle (not shown). It is to be understood that the vehicle drive system 10 may be used in combination with a drive wheel 12 for a plurality of motor driven vehicles, non-limiting examples of which include automobiles, motorcycles, scooters, and/or the like. In these examples, each driven wheel of the vehicle may include its own vehicle drive system 10, or two or more of the wheels may be controlled by a single vehicle drive system 10. As disclosed herein, the vehicle drive system 10 may be particularly suited for motorized wheelchairs, where each driven wheel of the wheelchair includes its own vehicle drive system 10.

The vehicle drive system 10 generally includes a motor 14 that communicates with the encoder 16 and the control unit 18, and is powered, either directly or indirectly, by a power source 20. Non-limiting examples of a suitable power source 20 includes a DC battery, a generator, a fuel cell, or the like, or combinations thereof. In an embodiment, the control unit 18 is operatively connected to the motor 14 and is configured to selectively permit a current to flow to the motor. This current is derived from an applied voltage from the power source 20 and travels through the control unit 18, where the control unit 18 regulates the voltage to the motor 14 via, e.g., pulse width modulation.

In pulse width modulation, an effective voltage is applied to the motor 14 over a time interval, where the effective voltage is a result of rapidly switching the voltage of the power supply ($V_{PS}$) on and off at a predetermined switching rate. The command duty cycle ($CDC_x$) measures the fraction of the duration of the cycle that the voltage is switched on. In a non-limiting example, the command duty cycle ($CDC_x$) is above 0%; and in a further non-limiting example, the $CDC_x$ ranges from about 0% to about 100%.

Using the effective voltage applied to the motor 14 and the resistance of the motor 14, the control unit 18 can thereby regulate the current flow ($I_x$) to the motor 14. In an embodiment, the amount of current ($I_x$) that flows to the motor 14 is above 0 A; and in a further non-limiting embodiment, $I_x$ generally ranges from about 0 A to about 100 A for a motorized wheelchair traveling at speeds of up to about 9 miles per hour.

Figure 2:
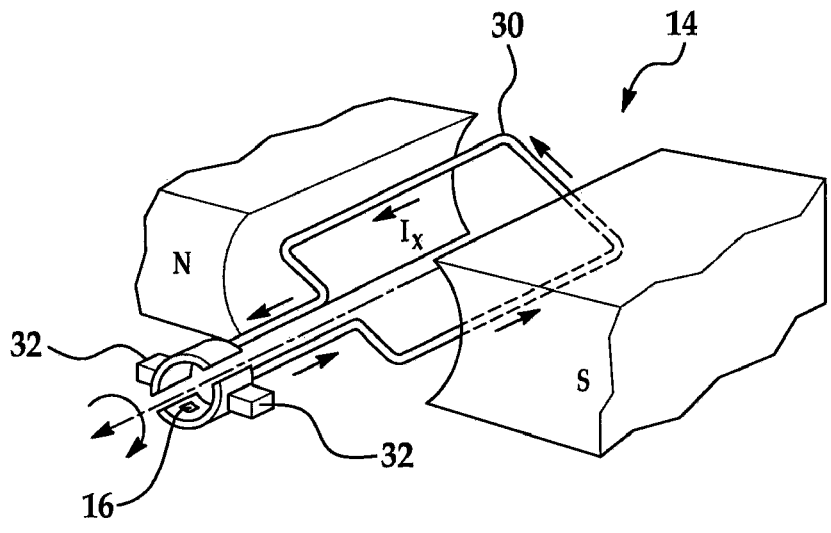
FIG. 2 is a semi-schematic depiction of a motor for the vehicle drive system of FIG. 1.

Referring now to FIG. 2, in an example, the motor 14 is an electric motor that generally includes an armature 30 configured to rotate in response to the current flowing from the control unit 18. The current $I_x$ flows through the armature 30 in a magnetic field and generates a torque, which causes the armature 30 to turn. In an embodiment, the motor 14 is a DC motor including brushes 32.

The encoder 16 is operatively connected to the armature 30 of the motor 14 and generally rotates in synchronization therewith. In an embodiment, the encoder 16 is directly connected to the armature 30. In another embodiment, the encoder 16 is indirectly connected to the armature 30 by, for example, connecting the encoder 16 to a shaft that is directly or indirectly rotationally driven in synchronization with the armature 30. It is to be understood that the term "synchronization" as used herein is intended to include speeds that are substantially similar, or speeds that are dissimilar but are proportional to each other.

In an embodiment, the encoder 16 is an absolute encoder, where the encoder produces a unique digital output for each determinable rotational position of the encoder. In another embodiment, the encoder 16 is an incremental encoder such as, for example, single channel encoders, dual encoders without quadrature, dual encoders with quadrature (one example of which has two pulse outputs about 90° out of phase), and/or the like, and or combinations thereof. These incremental encoders generally output a digital pulse that is repeated every time the encoder rotates through a predetermined angle of rotation. In a non-limiting example, the encoder 16 may be a thirty-two count per revolution, incremental magnetic encoder that outputs a digital pulse thirty-two times per revolution of the armature 30. In another non-limiting example, the encoder 16 may be a two channel, sixteen count per revolution, incremental encoder with quadrature (i.e., a dual encoder with quadrature). In yet another embodiment, the encoder 16 may be any of the aforementioned encoder types configured to have higher or lower resolution, more channels, and/or combinations thereof.

The output from the encoder 16 is generally used to determine the rate of change over a predetermined interval of time of the rotational position of the encoder 16, i.e., the speed of the encoder. The speed of the motor ($\omega_{motor}$) is determined based upon its proportionality to the speed of the encoder.

When the armature 30 rotates, the digital output from the encoder 16 is provided as an input signal to the control unit 18. The control unit 18 uses this input to determine or otherwise calculate parameters (e.g., error of the motor speed $\omega_A$) used for detecting whether the encoder 16 has malfunctioned, as will be described in more detail below.

The control unit 18 is an electronic system that receives the input from the encoder 16 and includes other information or parameters programmed therein such as, for example, the resistance of the armature ($R_x$), the back EMF constant of the motor ($K_{BackEMFx}$), conversion factors, and/or the like. The control unit 18 also measures other inputs such as, for example, voltage of the power source 20 ($V_{PS}$), the current ($I_x$), and/or the like. The control unit 18 is configured to calculate or otherwise determine one or more outputs based on the several inputs and/or programmed parameters, non-limiting examples of which include the estimated rotational speed ($\omega_x$) of the armature 30 (i.e., the estimated motor speed), the maximum allowable error of the motor speed ($\omega_E$), and the error of the motor speed ($\omega_A$), all of which are determined at a measured current ($I_x$).

Figure 3:
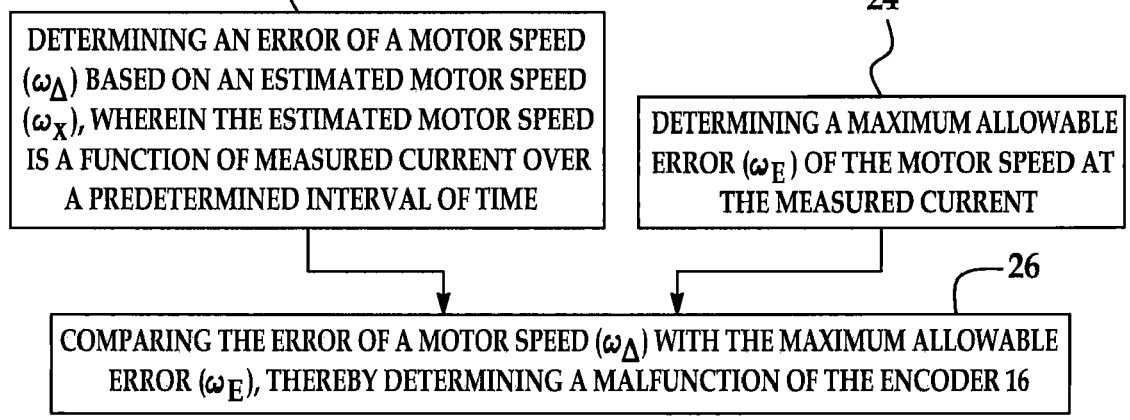
FIG. 3 is a flow diagram depicting an embodiment of a method of detecting a malfunction of the encoder used in the vehicle drive system of FIG. 1.

An example of the present method of detecting a malfunction of the encoder 16 is generally depicted in FIG. 3. The method includes the steps of determining an error of the motor speed ($\omega_A$) based on the estimated motor speed ($\omega_x$), wherein the estimated motor speed is a function of a measured current ($I_x$) over a predetermined interval of time (Block 22); determining a maximum allowable error of the motor speed ($\omega_E$) at the measured current ($I_x$) (Block 24); and comparing the error of the motor speed ($\omega_A$) with the maximum allowable error ($\omega_E$), thereby detecting the malfunction of the encoder 16 (Block 26).

The estimated motor speed ($\omega_x$) (estimated in rpm) is determined by the control unit 18 by calculating the speed ($\omega_x$) according to Equation 1:

$$\omega_x = \frac{(V_{PS}CDC_X - I_xR_x) \times 9.55}{K_{BackEMFx}} \qquad \text{(Equation 1)}$$

where $V_{PS}$ is the applied voltage (measured in V) from the power source 20, $CDC_x$ is the command duty cycle of the motor 14, $I_x$ is the current (measured in A) of the motor 14, $R_x$ is the resistance (measured in Ω) of the motor 14 (generally ranging from about 0.050Ω to about 0.100Ω in an example), $K_{BackEMFx}$ is the back EMF constant (measured in V/(rad/s)) of the motor 14, and 9.55 is a conversion factor having the units of rpm/(rad/s).

The maximum allowable error of the motor speed ($\omega_E$) (measured in rpm) is determined by the control unit 18 by calculating the maximum allowable error of the motor speed ($\omega_E$) according to Equation 2:

$$\omega_E = I_x K_{error} \qquad \text{(Equation 2)}$$

where $I_x$ is the current (measured in A) of the motor 14, and $K_{error}$ is an experimentally or theoretically obtained speed error constant (measured in rpm/A). In an embodiment, $K_{error}$ ranges from about 5 rpm/A to about 20 rpm/A.

The error of the motor speed ($\omega_A$) (measured in rpm) is determined by the control unit 18 by calculating the error of the motor speed ($\omega_A$) according to Equation 3:

$$\omega_A = |\omega_x - \omega_{motor}| \qquad \text{(Equation 3)}$$

where $\omega_{motor}$ is the motor speed (measured in rpm).

After the control unit 18 determines the error of the motor speed ($\omega_A$) and the maximum allowable error of the motor speed ($\omega_E$), the control unit 18 compares the two values and detects whether the encoder 16 is malfunctioning. It is to be understood that in order to have a substantially reliable comparison between the two values $\omega_A$ and $\omega_E$, the values should be calculated using substantially the same measured current ($I_x$) over substantially the same predetermined interval of time.

Based on the comparison of $\omega_E$ and $\omega_A$, if the control unit 18 determines that the error of the motor speed $\omega_A$ is greater than the maximum allowable error of the motor speed $\omega_E$ at the measured current over the predetermined interval of time, the encoder 16 is considered to be malfunctioning. Alternatively, if the error of the motor speed $\omega_A$ is substantially equal to or smaller than the maximum allowable error of the motor speed $\omega_E$ at the measured current over the predetermined interval of time, then the encoder 16 is not considered to be malfunctioning.

Detecting a malfunction of the encoder 16 is advantageously accomplished using a single encoder 16 in combination with the disclosed method applied by the control unit 18. However, the method may also be used in combination with two or more other encoders. This is especially suitable for dual encoders with quadrature, where two encoders are used that have a predetermined phase relationship with each other. Also, one or more additional encoders may assist in detecting a malfunction of the primary encoder 16. It is to be understood, however, that redundant encoders may, in some instances, complicate the vehicle drive system 10, add cost to the vehicle drive system 10, and generally require additional diagnostic techniques to detect whether the other encoder(s) 16 are malfunctioning. Also, if there is an encoder malfunction, it may often be difficult to ascertain which of the encoders is malfunctioning.

It is to be understood that the term "connect/connected" is broadly defined herein to encompass a variety of divergent connection arrangements and assembly techniques. These arrangements and techniques include, but are not limited to (1) the direct connection between one component and another component with no intervening components therebetween; and (2) the connection of one component and another component with one or more components therebetween, provided that the one component being "connected to" the other component is somehow operatively connected to the other component (notwithstanding the presence of one or more additional components therebetween).

While several embodiments have been described in detail, it will be apparent to those skilled in the art that the disclosed embodiments may be modified and/or other embodiments may be possible. Therefore, the foregoing description is to be considered exemplary rather than limiting.

What is claimed is:

1. A method of detecting a malfunction of an encoder used in a vehicle drive system comprising:
   determining an error of a motor speed ($\omega_A$) based on an estimated motor speed ($\omega_x$), the estimated motor speed being a function of measured current over a predetermined interval of time;
   determining a maximum allowable error of the motor speed ($\omega_E$) at the measured current;
   comparing the error of the motor speed ($\omega_A$) with the maximum allowable error of the motor speed ($\omega_E$), thereby detecting the malfunction of the encoder, wherein the encoder is considered to be malfunctioning if the error of the motor speed is substantially greater than the maximum allowable error; and
   determining the estimated motor speed by calculating the estimated motor speed using the equation:

$$\omega_x = \frac{\left(V_{PS}\frac{CDC_x}{100} - I_x R_x\right) \times 9.55}{K_{BackEMF_x}}$$

wherein: $\omega_x$ is the estimated motor speed in rpm; $V_{PS}$ is the applied voltage from the power source in V; $CDC_x$ is a command duty cycle of the motor; $I_x$ is the current of the motor in A; $R_x$ is the resistance of the motor in $\Omega$; $K_{BackEMF_x}$ is the back EMF constant of the motor in V/(rad/s); and 9.55 is a conversion factor having the units of rpm/(rad/s).

2. The method as defined in claim 1 wherein $R_x$ ranges from about 0.050 $\Omega$ to about 0.100 $\Omega$.

3. The method as defined in claim 1 wherein $CDC_x$ ranges from above 0% to about 100%.

4. The method as defined in claim 1 wherein $I_x$ ranges from above 0 A to about 100 A.

5. The method as defined in claim 1 wherein the vehicle drive system is used in a motorized wheelchair.

6. The method as defined in claim 1 wherein determining the maximum allowable error of the motor speed is accomplished by calculating the maximum allowable error using the equation:

$$\omega_E = I_x K_{error}$$

wherein: $\omega_E$ is the predetermined maximum allowable error of the motor speed in rpm; $I_x$ is the current of the motor in A; and $K_{error}$ is an estimated speed error constant in rpm/A.

7. The method as defined in claim 6 wherein: $K_{error}$ ranges from about 5 rpm/A to about 20 rpm/A; and $I_x$ ranges from above 0 A to about 100 A.

8. The method as defined in claim 6 wherein determining the error of the motor speed ($\omega_A$) is accomplished by calculating the error of the motor speed ($\omega_A$) using the equation:

$$\Omega_A = |\omega_x - \omega_{motor}|$$

wherein: $\omega_A$ is the error of the motor speed in rpm; and $\Omega_{motor}$ is the motor speed.

9. A vehicle drive system, comprising:
   a motor including a rotatable armature;
   an encoder operatively connected to the armature, wherein the encoder provides an output substantially synchronized with rotation of the armature; wherein the encoder is selected from single channel encoders, dual encoders without quadrature, dual encoders with quadrature, absolute position encoders, and combinations thereof;
   a control unit operatively connected to the motor and configured to selectively permit a current to flow to the motor, wherein the control unit is configured to:
      calculate an error of a motor speed ($\omega_A$) based on an estimated motor speed ($\omega_x$), wherein the estimated motor speed ($\omega_x$) is a function of a measurement of current over a predetermined interval of time;
      calculate a maximum allowable error of the motor speed ($\omega_E$) at the measured current; and
      compare the error of the motor speed ($\omega_A$) with the maximum allowable error of the motor speed at the measured current;
   wherein if the error of the motor speed is substantially greater than the maximum allowable error of the motor speed at the measured current over the predetermined interval of time, the encoder is considered to be malfunctioning; and
   the estimated motor speed is calculated via the equation:

$$\omega_x = \frac{\left(V_{PS}\frac{CDC_X}{100} - I_x R_x\right) \times 9.55}{K_{BackEMF_x}}$$

wherein: $\omega_x$ is the estimated motor speed in rpm; $V_{PS}$ is the applied voltage from the power source in V; $CDC_x$ is a command duty cycle of the motor; $I_x$ is the current of the motor in A; $R_x$ is the resistance of the motor in $\Omega$; $K_{BackEMF_x}$ is the back EMF constant of the motor in V/(rad/s); and 9.55 is a conversion factor in rpm/(rad/s).

10. The vehicle drive system as defined in claim 9 wherein the motor is a DC motor with brushes.

11. The vehicle drive system as defined in claim 9 wherein $R_x$ ranges from about 0.050 $\Omega$ to about 0.100 $\Omega$.

12. The vehicle drive system as defined in claim 9 wherein $CDC_x$ ranges from above 0% to 100%.

13. The vehicle drive system as defined in claim 9 wherein $I_x$ ranges from above 0 A to about 100 A.

14. The vehicle drive system as defined in claim 9 wherein the vehicle drive system is configured for use in a motorized wheelchair.

15. The vehicle drive system as defined in claim 9 wherein the maximum allowable error of the motor speed at the measured current is calculated via the equation:

$$\omega_E = I_x K_{error}$$

wherein: $\omega_E$ is the predetermined maximum allowable error of the motor speed in rpm; $I_x$ is the current of the motor in A; and $K_{error}$ is an estimated speed error constant in rpm/A.

16. The vehicle drive system as defined in claim 15 wherein $K_{error}$ ranges from about 5 rpm/A to about 20 rpm/A; and wherein $I_x$ ranges from above 0 A to about 100 A.

17. The vehicle drive system as defined in claim 15 wherein determining the error of the motor speed ($\omega_A$) is accomplished by calculating the error of the motor speed ($\omega_A$) using the equation:

$$\Omega_A = |\omega_x - \omega_{motor}|$$

wherein: $\omega_A$ is the error of the motor speed in rpm; and $\omega_{motor}$ is the motor speed.

18. A vehicle drive system, comprising:
a motor including a rotatable armature;
an encoder operatively connected to the armature, wherein the encoder provides an output substantially synchronized with rotation of the armature;
a control unit operatively connected to the motor and configured to selectively permit a current to flow to the motor, wherein the control unit is configured to:
calculate an error of a motor speed ($\omega_A$) based on an estimated motor speed ($\omega_x$), wherein the estimated motor speed ($\omega_x$) is a function of a measurement of current over a predetermined interval of time;
calculate a maximum allowable error of the motor speed ($\omega_E$) at the measured current; and
compare the error of the motor speed ($\omega_E$) with the maximum allowable error of the motor speed at the measured current;
wherein if the error of the motor speed is substantially greater than the maximum allowable error of the motor speed at the measured current over the predetermined interval of time, the encoder is considered to be malfunctioning; and
the estimated motor speed is calculated via the equation:

$$\omega_x = \frac{\left(V_{PS}\frac{CDC_X}{100} - I_x R_x\right) \times 9.55}{K_{BackEMF_x}}$$

wherein: $\omega_x$ is the estimated motor speed in rpm; $V_{PS}$ is the applied voltage from the power source in V; $CDC_x$ is a command duty cycle of the motor; $I_x$ is the current of the motor in A; $R_x$ is the resistance of the motor in $\Omega$; $K_{BackEMF_x}$ is the back EMF constant of the motor in V/(rad/s); and 9.55 is a conversion factor in rpm/(rad/s).

* * * * *